United States Patent
Hardy et al.

(10) Patent No.: US 10,707,472 B2
(45) Date of Patent: Jul. 7, 2020

(54) LOW NICKEL, MULTIPLE LAYER LAMINATE SYSTEM

(71) Applicant: EMS ENGINEERED MATERIALS SOLUTIONS, LLC, Attleboro, MA (US)

(72) Inventors: Michael D. Hardy, Cumberland, RI (US); Michael Haynes, Attleboro, MA (US)

(73) Assignee: EMS Engineered Materials Solutions, LLC, Attleboro, MA (US)

( * ) Notice: Subject to any disclaimer, the term of this patent is extended or adjusted under 35 U.S.C. 154(b) by 76 days.

(21) Appl. No.: 14/730,921

(22) Filed: Jun. 4, 2015

(65) Prior Publication Data
US 2015/0357621 A1    Dec. 10, 2015

Related U.S. Application Data

(60) Provisional application No. 62/007,679, filed on Jun. 4, 2014.

(51) Int. Cl.
*B32B 15/00*        (2006.01)
*H01M 2/24*         (2006.01)
(Continued)

(52) U.S. Cl.
CPC ............ *H01M 2/24* (2013.01); *B32B 15/015* (2013.01); *H01M 2/202* (2013.01);
(Continued)

(58) Field of Classification Search
CPC . H01M 2/202; H01M 2/24; Y10T 428/12924; Y10T 428/12944;
(Continued)

(56) References Cited

U.S. PATENT DOCUMENTS 1,824,497 A    9/1931  Percell
3,212,865 A    10/1965 Miller
(Continued)

FOREIGN PATENT DOCUMENTS

CN    1824497        2/2005
CN    1824497 A  *   8/2006   ............ B32B 15/01
(Continued)

OTHER PUBLICATIONS

Xu, Zhouhui Machine translation of CN-1824497-A, Aug. 30, 2006.*
(Continued)

*Primary Examiner* — David Sample
*Assistant Examiner* — Elizabeth Collister
(74) *Attorney, Agent, or Firm* — Smith Gambrell & Russell LLP (57) ABSTRACT

A multiple layer metallic laminate having more desirable electrical properties as compared to known embodiments includes multiple layers of metallic sheets clad together. The multiple layer laminate composite includes at least a first metallic layer having good soldering properties, such as commercially available nickel or nickel alloys, a second metallic layer having good resistance welding properties, such as commercial available steels or stainless steels, a third metallic layer having low electrical resistivity properties, such as commercially available copper and copper alloys, a fourth metallic layer have good resistance welding properties, such as commercially available steels or stainless steels, and a fifth metallic layer having good soldering properties, such as commercially available nickel or nickel alloys.

18 Claims, 7 Drawing Sheets

(51) Int. Cl.
  *B32B 15/01* (2006.01)
  *H01M 2/20* (2006.01)
(52) U.S. Cl.
  CPC .......... *Y10T 428/12924* (2015.01); *Y10T 428/12944* (2015.01); *Y10T 428/12972* (2015.01); *Y10T 428/12979* (2015.01)
(58) Field of Classification Search
  CPC ..... Y10T 428/12972; Y10T 428/12979; B32B 15/015
  See application file for complete search history.

(56) References Cited

U.S. PATENT DOCUMENTS

| | | | |
|---|---|---|---|
| 3,490,126 | A | 1/1970 | Miller |
| 5,300,809 | A | 4/1994 | Nakamura et al. |
| 8,420,225 | B2 | 4/2013 | Haynes et al. |
| 2001/0017173 | A1* | 8/2001 | Hiramatsu ............ C21D 6/004 148/325 |
| 2009/0169918 | A1 | 7/2009 | Haynes |
| 2010/0285352 | A1 | 11/2010 | Juzkow et al. |

FOREIGN PATENT DOCUMENTS

| | | | | |
|---|---|---|---|---|
| CN | 1824497 | A | † 8/2006 | |
| EP | 2 272 616 | A1 | 1/2011 | |
| JP | 2012197466 | A | * 10/2012 | ............... C22C 9/04 |
| WO | 2007/071425 | A1 | 6/2007 | |
| WO | 2007071425 | | 6/2007 | |

OTHER PUBLICATIONS

Machine translation: Kakitani [JP 2012-197466] (ranslated Jul. 18, 2018). (Year: 2012).*
Ametek: "The Benefits of Commercially Pure Wrought Powder Metallurgy Alloy Strip in Lithium Battery and Nickel Cadmium Energy Systems", Dec. 5, 2012, XP055425148, URL:http://www.ametek-ct.com/-/media/ametekct/pdf/technical%20literature/ultra%20power%20tech%20brief.pdf.
Chinese Office Action dated Jan. 31, 2018 in Chinese Application No. 201580029783.9.
European Search Report completed Nov. 15, 2017 in European Application No. EP 15 80 2507.
JIS Japanese Industrial Standard JIS G 4051-1979, Carbon Steels for Machine Structural Use.
European Office Action dated Sep. 9, 2018 in European Application No. 15 802 509-2.
Chinese Office Action dated Nov. 5, 2018 in Chinese Application No. 201580029783.9 with concise statement (The examiner has rejected the claims as they do not possess inventiveness over CN1824497A.).
The Chinese Decision of Rejection issued by the Chinese Intellectual Property Office for corresponding Chinese application No. 2015800297839 dated May 10, 2019; 14 pages.
The Office Action issued by the European Patent Office for corresponding European Patent Application No. 15802507.2 dated Aug. 27, 2019; 8 pages.
The Office Action released by the Taiwan Patent Office for corresponding Taiwan Patent Application No. 104118218 dated Jul. 12, 2019; 8 pages.
The Office Action issued by the Taiwan Patent Office for corresponding Taiwan Patent Application No. 104118218 dated Dec. 10, 2018; 12 pages.
Office Action issued by the Japanese Patent Office for corresponding Japanese Patent Application No. 2016-571266 dated Feb. 5, 2019; 10 pages.
The final Office Action issued by the Japanese Patent Office for corresponding Japanese Patent Application No. 2016-571266 dated Jan. 7, 2020: 7 pages.
The Office Action with English translation released by the Taiwan Patent Office for corresponding Taiwan Patent Application No. 104118218 dated Feb. 21, 2020; 8 pages.
High Performance Alloys, Nickel 201 (N02201), (2014), http://www.hpalloy.com/alloys/descriptions/NICKEL201 (accessed Dec. 20, 2016).†

* cited by examiner
† cited by third party

Figure 1

| Conversion from Resistivity to %IACS | | | | |
|---|---|---|---|---|
| step 1: Convert from OCMF to Ohm Meters | 54.75 / 601.68 = | | 0.090995213 μohm-m = | 9.0995E-08 ohm-m |
| step 2: Invert to obtain conductivity in S/m | 9.0995E-08 --> | 1.09896E+07 S/m | | |
| step 3: 100% IACS refers to a conductivity of 5.8 X 10⁷ S/m. Ratio two numbers to obtain %IACS. | | | | |

| Material System | Ratio (Volume %) | Thickness (inches) | Temper | % IACS | Yield Strength (Ksi) | Tensile Strength (Ksi) | % Tensile Elongation | Erichsen Cup Height (inches) |
|---|---|---|---|---|---|---|---|---|
| N02201/S43000/C10200/S43000/N02201 | 1.5%/31.5%/34.0%/31.5%/1.5% | 0.0118 | Annealed | 34.5% | 37.6 | 58.8 | 32.1% | --- |
| N02201/S43000/C10200/S43000/N02201 | 1.5%/31.5%/34.0%/31.5%/1.5% | 0.0098 | Annealed | 34.4% | 35.8 | 60.3 | 30.5% | 0.368 |
| N02201/S43000/C10200/S43000/N02201 | 1.5%/31.5%/34.0%/31.5%/1.5% | 0.0079 | Annealed | 34.1% | 38.4 | 60.0 | 29.1% | --- |
| N02201/S43000/C10200/S43000/N02201 | 1.5%/31.5%/34.0%/31.5%/1.5% | 0.0050 | Annealed | 32.8% | 36.5 | 62.7 | 32.5% | 0.353 |
| N02201/S43000/C10200/S43000/N02201 | 1.5%/31.5%/34.0%/31.5%/1.5% | 0.0040 | Annealed | 32.4% | 36.9 | 61.5 | 32.4% | --- |
| N02201/S43000/C10200/S43000/N02201 | 1.4%/28.6%/40.0%/28.6%/1.4% | 0.0118 | Annealed | 40.2% | 35.9 | 55.7 | 32.7% | --- |
| N02201/S43000/C10200/S43000/N02201 | 1.4%/28.6%/40.0%/28.6%/1.4% | 0.0098 | Annealed | 40.5% | 35.9 | 56.4 | 32.5% | 0.364 |
| N02201/S43000/C10200/S43000/N02201 | 1.4%/28.6%/40.0%/28.6%/1.4% | 0.0050 | Annealed | 38.0% | 33.9 | 59.2 | 29.9% | 0.271 |
| N02201/S30403/C10200/S30403/N02201 | 1.6%/32.4%/32.0%/32.4%/1.6% | 0.0157 | Annealed | 29.8% | 29.7 | 72.7 | 55.7% | --- |
| N02201/S30403/C10200/S30403/N02201 | 1.6%/32.4%/32.0%/32.4%/1.6% | 0.0118 | Annealed | 29.6% | 31.1 | 76.6 | 49.2% | 0.404 |
| N02201/S30403/C10200/S30403/N02201 | 1.6%/32.4%/32.0%/32.4%/1.6% | 0.0098 | Annealed | 29.0% | 31.7 | 77.7 | 49.7% | 0.428 |
| N02201/S30403/C10200/S30403/N02201 | 1.6%/32.4%/32.0%/32.4%/1.6% | 0.0050 | Annealed | 26.0% | 33.0 | 79.7 | 44.5% | 0.433 |
| N02201/S30403/C10200/S30403/N02201 | 1.3%/27.7%/42.0%/27.7%/1.3% | 0.0098 | Annealed | 38.5% | 28.5 | 73.0 | 45.8% | 0.451 |
| N02201/S30403/C10200/S30403/N02201 | 1.3%/27.7%/42.0%/27.7%/1.3% | 0.0050 | Annealed | 35.2% | 30.1 | 74.1 | 35.2% | 0.472 |
| N02201/S30403/C10200/S30403/N02201 | 0.85%/17.65%/63.0%/17.65%/0.85% | 0.0200 | Annealed | 60.4% | 16 | 52.5 | 60.5% | 0.469 |
| N02201/S30403/C10200/S30403/N02201 | 0.85%/17.65%/63.0%/17.65%/0.85% | 0.0150 | Annealed | 59.1% | 16.6 | 52.3 | 53.3% | 0.377 |
| N02201 (Typical Properties) | | 0.005-0.0098 | 1/4 Hard | 20.0% | 35.0 | 70.0 | 35.0% | 0.478 |
| N02201 (Typical Properties) | | 0.005-0.0098 | Annealed | 20.0% | 15.0 | 60.0 | 45.0% | 0.309 |
| N02270 (High Purity Powder Nickel, Typical Properties) | | 0.005-0.0098 | 1/4 Hard | 22.6% | 35.0 | 62.0 | 30.0% | 0.451 |
| N02270 (High Purity Powder Nickel, Typical Properties) | | 0.005-0.0098 | Annealed | 22.6% | 15.0 | 53.0 | 44.0% | |

Figure 7

LOW NICKEL, MULTIPLE LAYER LAMINATE SYSTEM

CROSS-REFERENCE TO RELATED APPLICATIONS

The present application claims priority from Provisional Patent Application No. 62/007,679, filed on Jun. 4, 2014, the disclosure of which is relied upon and incorporated herein by reference.

FIELD OF THE INVENTION

The present invention relates to a laminate composite having multiple layers of a particular metal or metal alloy. The laminate composite comprises at least a first metallic layer having good soldering properties, such as commercially available nickel or nickel alloys, a second metallic layer having good resistance welding properties, such as commercial available steels or stainless steels, a third metallic layer having low electrical resistivity properties, such as commercially available copper and copper alloys, a fourth metallic layer having good resistance welding properties, such as commercially available steel or stainless steels, and a fifth metallic layer having good soldering properties, such as commercially available nickel or nickel alloys.

BACKGROUND OF THE INVENTION

Historically, electrical connections between individual batteries in a battery pack were typically made with a commercially available nickel metallic strip. Nickel has been a common material for use as an electrical connection between individual batteries in a battery pack, due to multiple advantages. Advantages of the nickel strip include good corrosion resistance, resistance welding properties, and low electrical resistivity, good joinability by spot welding, and good solderability for terminal connections. Also, for the use of Lithium Ion batteries in low power "energy" sectors (e.g., personal computer notebooks, cell phones, tablets, digital cameras, etc.), the conductivity properties of pure Nickel have been sufficient to minimize detrimental heating of the battery pack.

However, as higher power applications have evolved (e.g., E-Bikes, Electric Vehicles, and Energy Storage), the need for a higher conductivity connection material has become apparent in order to minimize resistive heating which can degrade battery performance and safety. The need is particularly important in bus connections where electrical and thermal flow are concentrated into a smaller cross sectional area, and where numerous cells contribute to the cumulative heating effect in that cross sectional area. For example, the number of cells in an energy storage application may exceed 20,000 individual cells.

It is also desirable in the marketplace to develop a lower cost connection material with less sensitivity to the Nickel metal commodity market. Consequently, it is desirable to develop a material with a lower overall nickel content, while maintaining or exceeding the beneficial properties of electrical conductivity, thermal conductivity, weldability, solderability, strength, and formability.

The term "solderability" is defined as the ability of a metal substrate to be wetted by molten solder. Good resistance welding properties are characterized by the properties of the two systems to be welded together. It is advantageous to have systems with compatible thermal properties and melting characteristics, and for no deleterious or brittle metallic phases to form as a result of the welding of the two systems. "Electrical resistivity" (inverse of electrical conductivity) is a measure of the materials resistance to electrical current flow as a material property. It is readily converted to electrical resistance through consideration of the current carrying cross section.

The term "bond" includes the adhering or joining of metallic layers though a metallurgical bond. Techniques for forming this bond involve conventional processes, which include roll bonding (cold or hot), welding, explosion bonding, diffusion bonding, electrodepositing, adhesive bonding, and other techniques known by those with ordinary skill in the art.

Challenges exist in the roll bonding of laminate composites or systems with a soft copper sandwiched between two stronger alloys, particularly for higher thickness fractions of the soft copper. The primary issue is cyclical variation in the thickness of the stronger outside layers, leading to inconsistency in properties. Such challenges have limited the past introduction of a superior conductivity system for electrical connections between individual cells in a battery pack. To those skilled in the art, a system with a thicker copper layer, and higher electrical and thermal conductivities, is desirable. An example of a commercially pure nickel is UNS N02201 wrought metallic strip. UNS, which is short for "Unified Numbering System for Metals and Alloys," is a systematic designation for metals. Due to highly unstable prices for elemental nickel, it is highly desirable to develop a low-nickel, multi-layer laminate with performance equivalent to conventional nickel systems.

SUMMARY OF THE INVENTION

A multiple layer laminate composite or system is described herein having improved properties over known embodiments. The multiple layer laminate composite includes at least a first metallic layer having good soldering properties, such as commercially available nickel or nickel alloys, a second metallic layer having good resistance welding properties, such as commercial available steels or stainless steels, a third metallic layer having low electrical resistivity properties, such as commercially available copper and copper alloys, a fourth metallic layer have good resistance welding properties, such as commercially available steels or stainless steels, and a fifth metallic layer having good soldering properties, such as commercially available nickel or nickel alloys.

More specifically, the multiple layer laminate composite comprising a first metallic alloy comprised of commercially available nickel or nickel alloys, a second metallic alloy comprised of commercial available steels or stainless steels, a third metallic layer comprised of commercially available copper and copper alloys, a fourth metallic layer comprised of commercially available steels or stainless steels, and a fifth metallic layer comprised of commercially available nickel or nickel alloys.

Thus, the present invention encompasses a multiple layer laminate composite comprised of:
  a first metallic layer having good soldering properties, selected from commercially available nickel or nickel alloys;
  a second metallic layer having good resistance welding properties, selected from commercially available steels or stainless steels;
  a third metallic layer having low electrical resistivity, selected from commercially available copper or copper alloys;

a fourth metallic layer having good resistance welding properties, selected from commercially available steels or stainless steels;

a fifth metallic layer having good soldering properties, selected from commercially available nickel or nickel alloys.

These and other aspects of the invention can be realized from a reading and understanding of the detailed description and drawings.

BRIEF DESCRIPTION OF THE DRAWINGS

FIG. 7 is a table detailing the layer make-up, physical properties, and mechanical properties of various embodiments of the laminate composite.

DETAILED DESCRIPTION OF THE INVENTION

A low nickel, multiple layer laminate composite or system 10 is described herein. The multiple layer laminate composite 10 exhibits good soldering characteristics, good resistance welding properties, and low electrical resistivity properties. The laminate composite 10 is manufactured by a "cold" bonding process known in the art, such as described in U.S. Patent Application Publication No. 2009/0169918, herein incorporated and relied upon by reference.

Figure 1:
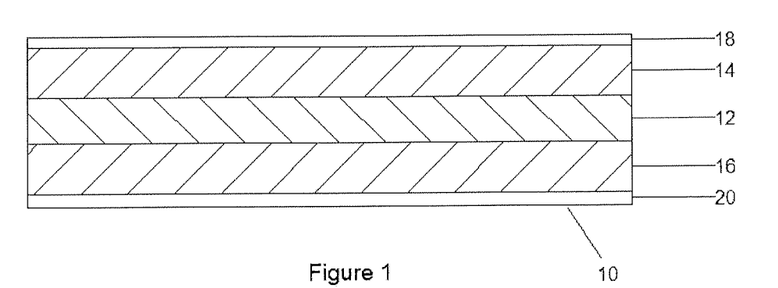
FIG. 1 shows a multiple layer metallic laminate composite according to the invention.

The specific composition of the multiple layer laminate composite 10 is shown in the embodiment illustrated in FIG. 1. The embodiment shown in FIG. 1 is for the laminate composite 10 having five metallic layers. This five layer embodiment includes a central layer 12 made of a metal or metallic alloy having low electrical resistivity. In the illustrated embodiment, this central layer 12 is made of copper or copper alloys to achieve the desired properties. The central layer 12 has a first side and a second side, and is sandwiched between two inner or internal layers 14, 16 of a metal or metallic alloy having good resistance welding properties. The first internal layer 14 abuts and is adjacent to the first side of the central layer 12 and the second internal layer 16 abuts and is adjacent to the second side of the central layer 12. In the illustrated embodiment, each internal layer 14, 16 is made of steel or stainless steel. The combined central 10 and internal layers 14, 16 are further sandwiched between two outer or external layers 18, 20 of a metal or metallic alloy having good soldering properties. In the illustrated embodiment, each outer layer 18, 20 is made of nickel or nickel alloys. The first external layer 18 abuts and is adjacent to the first internal layer 14, and the second external layer 20 abuts and is adjacent to the second internal layer 16.

More specifically, looking to the embodiment in FIG. 1, the laminate composite 10 having the following combinations, or ones substantially similar, have been determined to have the desired properties:

First five layer embodiment:
  First Layer (18): 1.5% N02201
  Second Layer (14): 31.5% S43000
  Third Layer (12): 34% C10200
  Fourth Layer (16): 31.5% S43000
  Fifth Layer (20): 1.5% N02201.
Second five layer embodiment:
  First Layer (18): 1.4% N02201.
  Second Layer (14): 28.6% S43000
  Third Layer (12): 40% C10200
  Fourth Layer (16): 28.6% S43000
  Fifth Layer (20): 1.4% N02201.
Third five layer embodiment:
  First Layer (18): 1.6% N2201
  Second Layer (14): 32.4% S30403
  Third Layer (12): 32% C10200
  Fourth Layer (16): 32.4% S30403
  Fifth Layer (20): 1.6% N02201.
Fourth five layer embodiment:
  First Layer (18): 1.3% N02201
  Second Layer (14): 27.7% S30403
  Third Layer (12): 42% C10200
  Fourth Layer (16): 27.7% S30403
  Fifth Layer (20): 1.3% N02201.
Fifth five layer embodiment:
  First Layer (18): 0.85% N02201
  Second Layer (14): 17.65% S30403
  Third Layer (12): 63% C10200
  Fourth Layer (16): 17.65% S30403
  Fifth Layer (20): 0.85% N02201
Sixth five layer embodiment:
  First Layer (18): 0.3% N02201
  Second Layer (14): 8.2% S30403
  Third Layer (12): 83% C10200
  Fourth Layer (16): 8.2% S30403
  Fifth Layer (20): 0.3% N02201
Seventh five layer embodiment:
  First Layer (18): 8% N02201
  Second Layer (14): 32% S30403
  Third Layer (12): 20% C10200
  Fourth Layer (16): 32% S30403
  Fifth Layer (20): 8% N02201
Eighth five layer embodiment:
  First Layer (18): 2.3% N02201
  Second Layer (14): 37.7% S30403
  Third Layer (12): 20% C10200
  Fourth Layer (16): 37.7% S30403
  Fifth Layer (20): 2.3% N02201

In this five layer embodiment, it is expected that the laminate composite 10 will maintain a much higher electrical conductivity compared to nickel, which may be advantageous, especially for higher power applications. For example, the rule-of-mixtures model for the embodiment above with 34% C10200 suggests a resistivity of 28.4 Ohms-Circ-Mil/Foot (0.047 µohms-m), corresponding to an electrical conductivity of 36.6% IACS ("International Annealed Copper Standard"). An expected degradation of between 10% and 30% (due to annealing during strip processing) would result in an expected conductivity between 25.6% IACS and 32.9% IACS. The actual degradation was found to vary between 5.7% for a finish thickness of 0.0118" and 11.5% for a finish thickness of 0.004".

Figure 2:
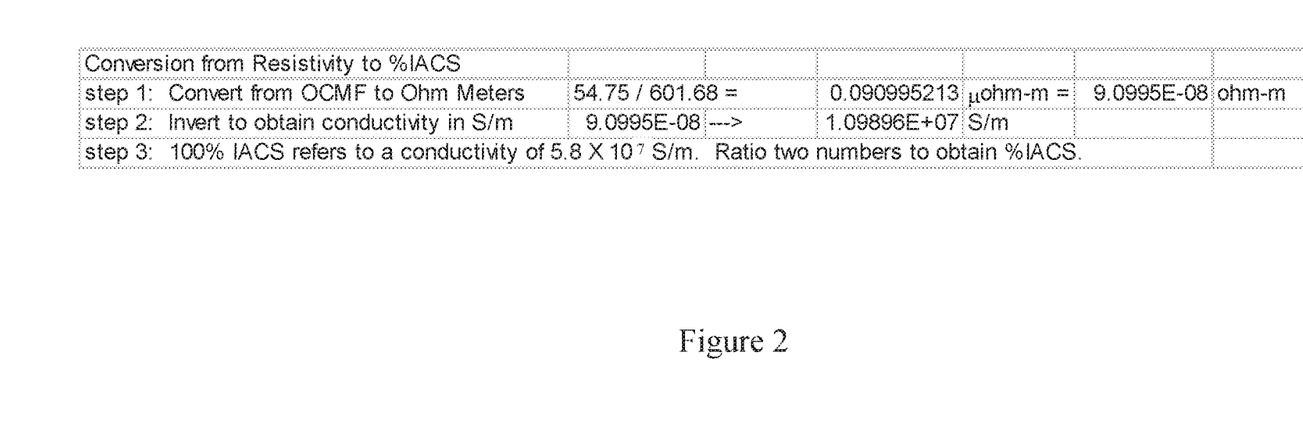
FIG. 2 is a table identifying the conversion between electrical resistivity and electrical conductivity.

Solderability testing of the laminate composite 10 has been qualitative. Resistance welding testing has been by definition specific to the end application of welding end tabs 110 between individual battery packs 104 (as described further herein and shown in FIGS. 6-9) to the anode and cathode lids and cans. Electrical Resistivity/Electrical Conductivity have been measured during engineering trials. The conductivity of the composite ranges from 20% IACS-80% IACS. Electrical resistivity has varied between 17.1 and 40 Ohms-Circular-Mil/Foot, equivalent to a range of 0.0285 to 0.0664 µohms-m. This converts to Electrical conductivity of between 60.4% IACS to 26% IACS. These conductivities are superior to the range for pure Nickel metallic strip. The conversion between Electrical Resistivity and Electrical conductivity is shown in the table of FIG. 2.

In the first embodiment illustrated in FIG. 1, the five layer laminate composite 10 is bonded in a manner that will result in improved electrical conductivity. This analysis is based on the knowledge and experience with such materials. In particular, a decrease in Electrical Conductivity is characterized with an increased annealing temperature after the bonding process. It is important for the product to anneal the S30400 stainless steel layer to provide suitable ductility for the application. However, annealing during strip processing will result in a modest degradation in the % IACS conductivity. For example, a theoretical rule-of-mixtures model for the laminate composite 10 of the fourth embodiment above (42% C10200) is predicted to result in a resistivity of 24.1 Ohms-Circ-Mil/Foot (0.040 µohms-m), corresponding to an electrical conductivity of 43.1% IACS ("International Annealed Copper Standard"). Strip processing resulted in actual electrical conductivities of 35.2% IACS at 0.005" finish thickness and 38.5% IACS at 0.0098" thickness, due to modest degradation in conductivity from strip annealing.

Other aspects of this invention include control of resistivity of the laminate composite 10 by:
1) Varying the ratio of the metallic layer system, particular the amount of the copper material;
2) Varying the alloy materials, particularly the copper alloy;
3) The use of varying annealing temperature, to alter diffusional mixing. For the latter point, the five layer embodiments shown in FIG. 1 can be produced to custom electrical conductivities by utilizing annealing temperature.

So corresponding to the embodiment in FIG. 1, the laminate composite 10 with the layer make-up shown in FIG. 10 and with the following dimensions are being manufactured:
  1.5% N02201/31.5% S43000/34% C10200/31.5% S43000/1.5% N02201.
  1.4% N02201/28.6% S43000/40% C10200/28.6% S43000/1.4% N02201.
  1.6% N02201/32.4% S30403/32% C10200/32.4% S30403/1.6% N02201.
  1.3% N02201/27.7% S30403/42% C10200/27.7% S30403/1.3% N02201.
  0.85% N02201/17.65% S30403/63% C10200/17.65% S30403/0.85% N02201.

In this embodiment, the laminate system 10 is expected to maintain a much higher electrical conductivity, which may be advantageous in various applications, especially for higher power applications. For example, the rule-of-mixtures model for the fifth embodiment above with 63% C10200 suggests a resistivity of 16.5 Ohms-Circ-Mil/Foot (0.027 µohms-m), corresponding to an electrical conductivity of 62.9% IACS. Strip processing resulted in actual electrical conductivities of 59.1% IACS at 0.015" finish thickness and 60.4% IACS at 0.020" thickness, due to modest degradation in conductivity from strip annealing.

The table of values shown in FIG. 7 provides % IACS conductivity, mechanical properties, and ductility properties for various embodiments of the five layer composite of FIG. 1, as well as providing typical properties of nickel alloys (N02201, 899M, and 899A). It is observed that the clad materials 10 provide similar mechanical properties to nickel alloys, particularly when compared to the quarter-hard temper of these alloys in common use in the industry. Superior electrical conductivities are obtained with the clad materials of the laminate composite 10 when compared to conventional nickel alloys.

Figure 3:
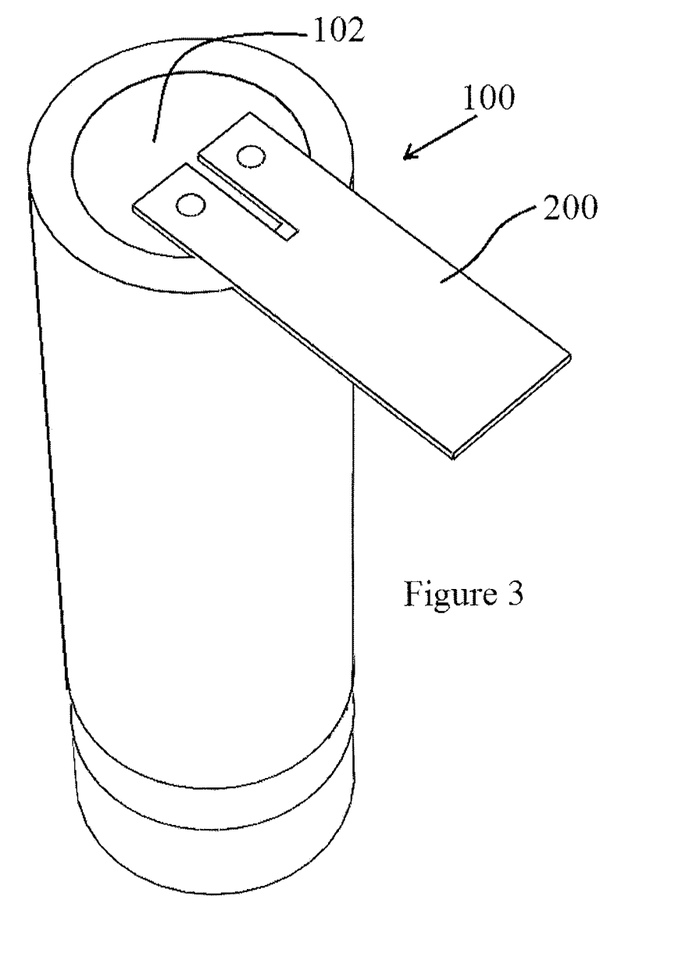
FIG. 3 is a top perspective view of a single battery cell and a laminate composite tab connected thereto.
Figure 4:
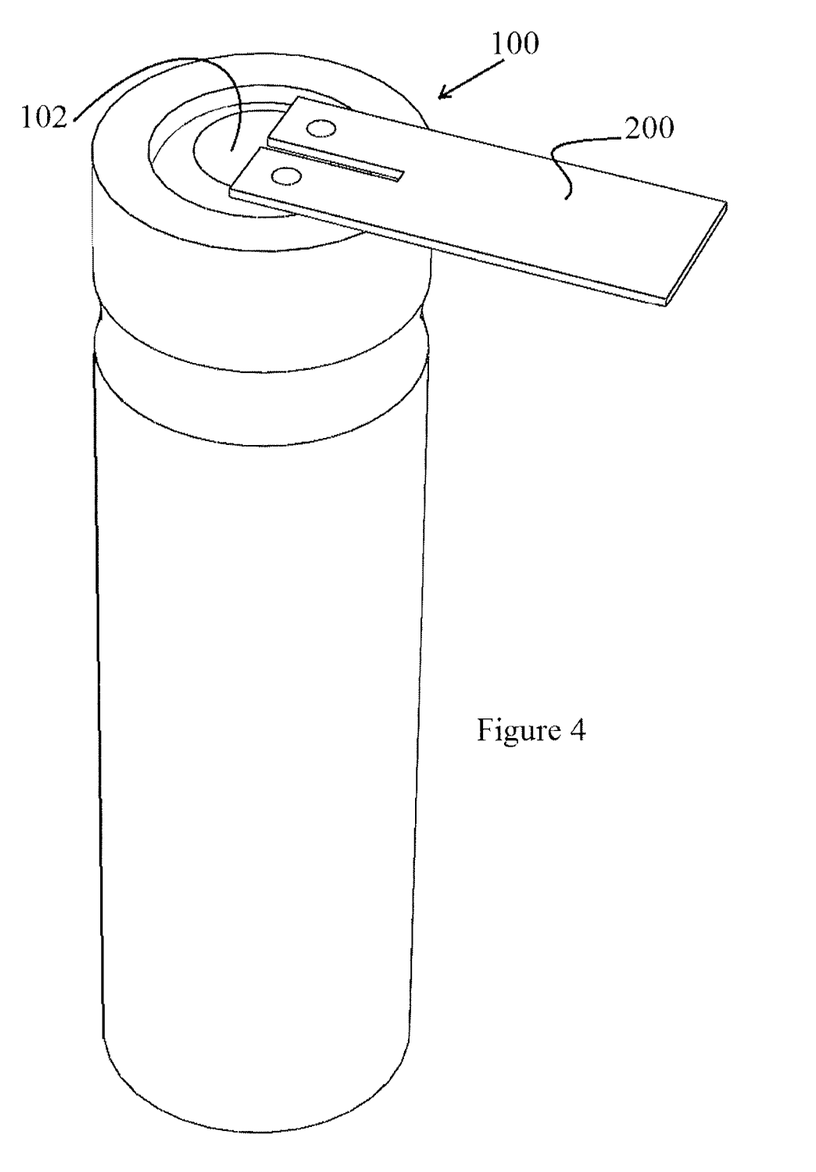
FIG. 4 is a bottom perspective view of a single battery cell and a laminate composite tab connected thereto.

The multiple layer laminate composite 10 described above may be used in a variety of applications, with one such application being as a connector tab 200 to join more than one li ion battery cell together. Welding of "connector tabs" formed out of the laminate composite 10 is readily achieved with a single pulse, alternating current (AC), resistance welder. Welding is aided with slots to avoid shunting, weld projections, and/or applying a step weld process, as is known in the art. The strengths of welds produced by this process meet or exceed the industry standards for pull strength. Looking to FIGS. 3 and 4, the Li ion cells 100 are cylindrical in nature and the connections between these cells 100 are made using connector tabs 200 welded onto the end caps 102 of the cylindrical battery cells 100. This allows joining many battery cells 100 in parallel to increase the collective voltage of the battery pack 104, 106 (multiple cells joined together) as illustrated in FIGS. 5 and 6, and used for powering hand tools, lap tops, and small equipment.

Today, the material of choice to connect such batteries is pure nickel because of its electrical and joinability properties (welding, soldering). However, using nickel has various disadvantages. First, the use of nickel in various applications comes at a high financial cost. Second, a disadvantage of nickel is its conductivity (or high resistivity).

Figure 5:
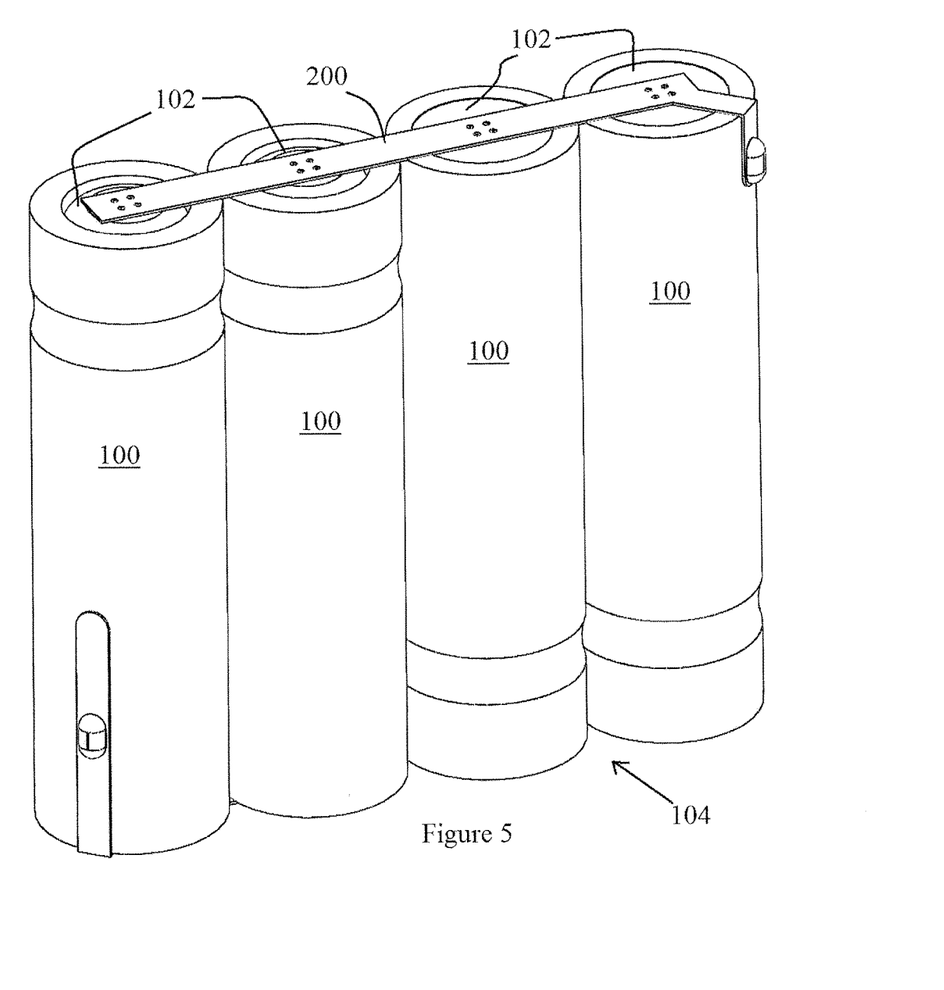
FIG. 5 is a perspective view of a battery pack including multiple battery cells connected with the laminate composite tab.
Figure 6:
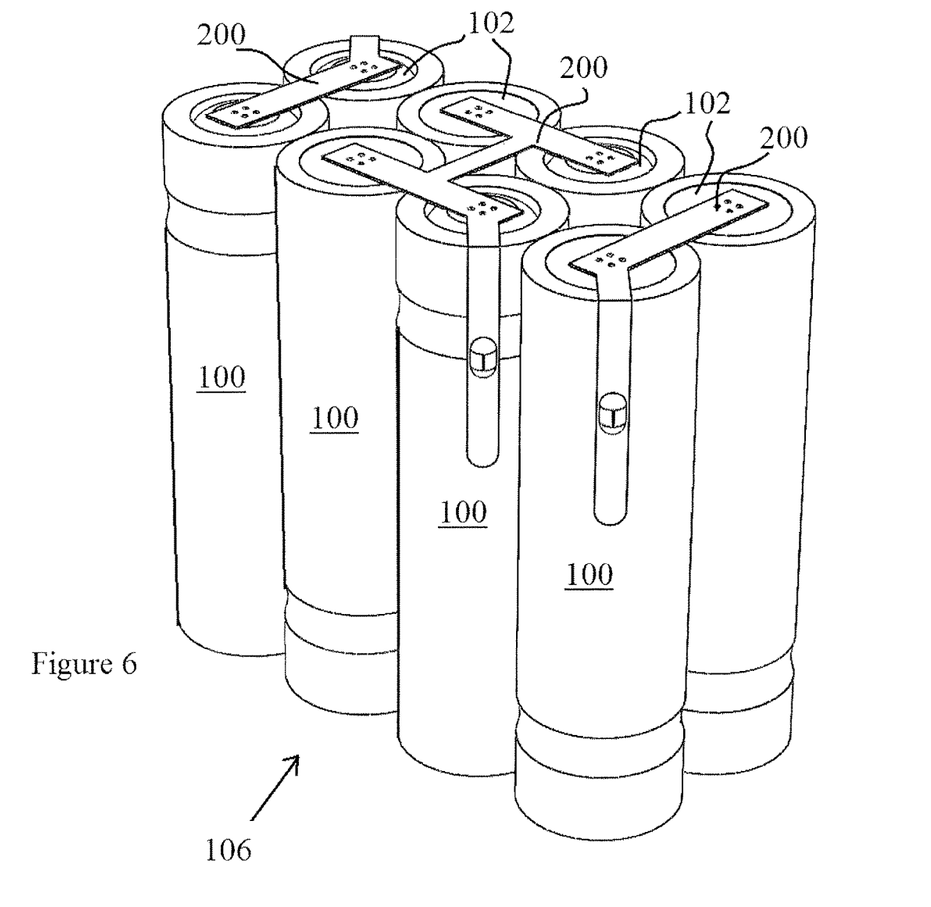
FIG. 6 is a perspective view of a second battery pack including multiple battery cells connected with the laminate composite tab.

In the first battery application shown in FIG. 5, the small battery pack 104 uses pure nickel (like laptop, iPad®'s or power tool battery packs) where the market driver is primarily cost. These applications are not as sensitive to the power or energy loss due to the conductivity of pure Ni. The second battery application represents a larger power module 106 (like for an e-bike, back up battery storage, or hybrid vehicle battery pack). For these applications, the high resistivity, or low conductivity nickel alloys becomes a major issue for these modules. High resistance means energy loss and heat. This application requires a better, more efficient current path.

In this case, the laminate composite 10 can offer an advantage without sacrificing performance. The embodiments of the multiple layer laminate composite 10 described herein provide a family of different conductivity clad materials by modifying or altering the copper ratio. For the small battery packs as shown in FIG. 5, a laminate composite 10 is provided that meets the same conductivity of pure nickel, but with a lower cost. For the larger power modules 106 as shown in FIG. 6, another laminate composite 10 is provided with 1.0-4× the conductivity of pure nickel. These high conductivity laminate composites are achieved with 0.3%-8.0% Nickel, 20%-83% Copper, and balance Stainless Steel. For those skilled in the art, 0.3%-2.0% Nickel has been found to give good properties for solderability, electrical conductivity, and corrosion resistance. Higher conductivity means lower resistivity; they are inversely proportional. This results in better energy efficiency and lower heat loss.

The key feature for all of these clad designs of laminate composites 10 is they have to be weldable and solderable. The outer nickel layer is provided for good solderability and corrosion resistance. The stainless steel layer offers good weldable structure, and the copper can be tailored to meet the market needs for conductivity.

Having thus described exemplary embodiments of a method to produce metallic composite material, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A metallic laminate composite comprising:
   a first metallic layer having good soldering properties, selected from nickel or nickel alloys, wherein good soldering properties is defined by having a better than average ability to be wetted by molten solder;
   a second metallic layer selected from steels or stainless steels;
   a third metallic layer having low electrical resistivity, selected from copper or copper alloys;
   a fourth metallic layer selected from steels or stainless steels; and
   a fifth metallic layer having good soldering properties, selected from nickel or nickel alloys, wherein the conductivity of the composite ranges from 30% to 80% IACS, and the tensile strength ranges from 52.3 to 79.7 Ksi.

2. The laminate composite as described in claim 1, wherein the third metallic layer is bonded to the second metallic layer and the fourth metallic layer, the first metallic layer is bonded to the second metallic layer, and the fifth metallic layer is bonded to the fourth metallic layer.

3. The laminate composite as described in claim 1, wherein, based on volume, the first layer comprises substantially 1.5% of the laminate composite; the second layer comprises substantially 31.5% of the laminate composite; the third layer comprises substantially 34% of the laminate composite; the fourth layer comprises 31.5% of the laminate composite; and the fifth layer comprises 1.5% of the laminate composite.

4. The laminate composite as described in claim 1 wherein, based on based on volume:
   the first layer comprises substantially 0.3% to 8% of the laminate composite;
   the second layer comprises substantially 8.2% to 34.7% of the laminate composite;
   the third layer comprises substantially 30% to 83% of the laminate composite;
   the fourth layer comprises 8.2% to 34.7% of the laminate composite; and
   the fifth layer comprises 0.3% to 8% of the laminate composite.

5. The laminate composite as described in claim 1, wherein the conductivity of the composite ranges from 40% IACS - 60% IACS.

6. The laminate composite as described in claim 1, wherein the first and fifth layers comprise nickel alloys.

7. The laminate composite as described in claim 1, wherein the nickel alloy comprises N02201, 899M, or 899A.

8. The laminate composite as described in claim 1, wherein the composite when soldered to a battery terminal meets industry pull strength standards.

9. The laminate composite as described in claim 1, wherein the ductility of the laminate, measured in tensile elongation percentage, ranges between 29.1% to 60.5%.

10. The metallic laminate composite of claim 1, wherein the second metallic layer and the fourth metallic layers are either S43000 or S30403.

11. The laminate composite as described in claim 1, wherein the yield strength ranges between 16.0 to 38.4 Ksi.

12. A metallic laminate composite comprising:
    a central metallic layer having low electrical resistivity, selected from copper or copper alloys, the metallic alloy having a first and second side;
    a first and second internal metallic layer, the first internal metallic layer positioned along the first side of the central metallic layer and the second internal metallic layer positioned along the second side of the central metallic layer, the first and second internal metallic layer selected from stainless steels; and
    a first and second outer metallic layer, wherein the first outer metallic layer adjacent the first internal metallic layer and the second outer metallic layer adjacent the second internal metallic layer, the first and second outer metallic layers selected from nickel or nickel alloys having good soldering properties, wherein good soldering properties is defined by having a better than average ability to be wetted by molten solder, wherein the conductivity of the laminate composite ranges from 30% to 80% IACS, and wherein the tensile strength of the metallic laminate composite ranges from 52.3 to 79.7 Ksi.

13. The metallic laminate composite as described in claim 12 wherein, based on volume, the first and second outer metallic layer comprises substantially 1.5% of the laminate composite; the first and second internal metallic layer comprises substantially 31.5% of the laminate composite; and the central metallic layer comprises substantially 34% of the laminate composite.

14. The metallic laminate composite as described in claim 12 wherein, based on volume:
    the first and second outer metallic layers each comprise substantially 0.3% to 8% of the laminate composite;
    the first and second internal metallic layers each comprise substantially 30% of the laminate composite; and
    the center layer comprises substantially 40% to 83% of the laminate composite.

15. A connector tab for a pack of lithium ion batteries comprising the metallic laminate composite of claim 12.

16. The laminate composite as described in claim 12, wherein the nickel alloy comprises N02201, 899M, or 899A.

17. The metallic laminate composite as described in claim 12, wherein the tensile elongation percentage of the composite ranges between 29.1% and 60.5%.

18. A metallic laminate composite for use as a connector tab for a pack of lithium ion batteries, the metallic laminate composite comprising:
    a central metallic layer having low electrical resistivity, selected from copper or copper alloys, the central metallic layer having a first and second side;
    a first internal metallic layer and a second internal metallic layer, the first internal metallic layer positioned along the first side of the central metallic layer and the second internal metallic layer positioned along the second side of the central metallic layer, the first and second internal metallic layers selected from steels or stainless steels; and a first outer metallic layer and a second outer metallic layer, wherein the first outer metallic layer abuts the first internal metallic layer and the second outer metallic layer abuts the second internal metallic layer, the first and second outer metallic layers selected from nickel or nickel alloys;

wherein the first and second outer metallic layers, based on volume, comprise substantially 0.3% to 8% of the laminate composite, the first and second internal metallic layers comprise substantially 8.2% to 34.7% of the laminate composite and the central metallic layer comprises substantially 30% to 83% of the laminate composite, wherein the conductivity of the composite ranges from 30% to 80% IACS, and wherein the tensile strength of the metallic laminate composite ranges from 52.3 to 79.7 Ksi.

* * * * *